United States Patent [19]
Benenati

[11] Patent Number: 5,503,545
[45] Date of Patent: Apr. 2, 1996

[54] MANIFOLD FOR INJECTION MOLDING APPARATUS

[76] Inventor: Salvatore Benenati, 3407 Rose Ave., Ocean, N.J. 07712

[21] Appl. No.: 278,506

[22] Filed: Jul. 21, 1994

Related U.S. Application Data

[62] Division of Ser. No. 27,858, Mar. 8, 1993, Pat. No. 5,352,109.

[51] Int. Cl.⁶ .............................. B29C 45/22; B29C 45/72
[52] U.S. Cl. .......................... 425/190; 425/547; 425/570; 425/572
[58] Field of Search ..................... 425/547, 549, 425/570, 572, 573, 588, DIG. 227, 190; 264/297.2, 328.8, 328.15

[56] References Cited

U.S. PATENT DOCUMENTS

| | | | |
|---|---|---|---|
| 4,292,018 | 9/1981 | Beale | 425/572 |
| 4,340,156 | 7/1982 | Muller | 222/146 HE |
| 4,588,367 | 5/1986 | Schad | 425/572 |
| 4,609,138 | 9/1986 | Harrison | 425/572 |
| 4,761,343 | 8/1988 | Gellert | 425/570 |
| 4,832,254 | 5/1989 | Peuke et al. | 425/572 |
| 4,964,795 | 10/1990 | Tooman | 425/572 |
| 5,007,821 | 4/1991 | Schmidt | 425/572 |
| 5,032,078 | 7/1991 | Benenati | 425/549 |

*Primary Examiner*—Khanh P. Nguyen

[57] ABSTRACT

A heated manifold system for use in the distribution of heated plastic resins to the various cavities of injection molds for thermoplastic materials. The manifold main structure consists of modular components of similar cross-section that are nested into each other by employing similar slots cut out at the points of intersection of the components. The thermoplastic resin passages are bored longitudinally in each modular component; transverse bores at each intersection provide resin passages between the longitudinal bores. The system includes heated nozzles which have slots to receive cartridge heaters and heater covers, also spring clips to retain the covers and heaters, which can rotate around the shank of the nozzle to allow easy replacement of the cartridge heaters in the event of failure. Internal sealed liquid-filled channels or highly conductive metal rods are used to equalize the temperature of the nozzle from one extremity to the other.

9 Claims, 3 Drawing Sheets

MANIFOLD FOR INJECTION MOLDING APPARATUS

This application is a division of my patent application Ser. No. 08/027,858 filed Mar. 8, 1993 now U.S. Pat. No. 5,352,109.

This invention relates generally to injection molding apparatus for producing thermoplastic products, and more particularly to heated manifolds for distributing molten plastic material from a common injection port to the various cavities of a mold.

In conventional molding practice, plastic molding material is heated to its fluid condition and forced along passages from a supply port to the cavities of a mold.

A manifested is used for providing heated passages and conveying fluid resin from a common supply port to the nozzles feeding the cavities.

Manifolds have been made of a block of steel that is bored to provide the passages for the molding material. The manifold is heated by electric heating elements in grooves or holes in the manifold's steel block. The unitary block of steel securely contains the fluid in the manifold's passages, despite pressures of perhaps twenty thousand pounds per square inch. Where the passages extend from the bores of the manifold into the manifold's nozzles, the abutting surfaces of the parts are made flat with high precision and securely clamped together to prevent leaks. The same care in avoiding leaks must be observed where two or more blocks are combined in a manifold.

An object of the invention is to provide a novel heated manifold which can be produced economically and quickly. More particularly, an object of the invention is to provide a novel manifold that can be assembled of interlocking prefabricated standardized components requiring only minor machining.

A further object of the invention is to provide a system of components that can be easily assembled to form a manifold that is easy to integrate with an existing or new injection mold.

An additional object of the invention is to provide a heated manifold of assembled components which is virtually leak-proof under high pressures.

An additional object of the invention is to provide a versatile system for constructing manifolds and conveying molten plastic resin to a number of points in the mold, adaptable to form a manifold for either a few mold cavities or many.

One more object of the invention is to provide easy means for assembling and disassembling the components of the manifold for the purpose of cleaning, repairing and adjusting the whole or part of the manifold.

One more object of the invention is to provide a nozzle for injecting the resin into the cavities of a mold which is easily and economically constructed and serviced.

Yet another object of the invention is to provide a nozzle which is heated by electric heating elements and which contains temperature averaging means comprising channels filled with or largely filled with heat-transfer liquid or metal.

Novel injection-mold manifolds are described in detail below and shown in the accompanying drawings, as illustrative embodiments of various aspects of the invention, for achieving the foregoing object and still other objects of the invention.

In the first of these embodiments, a novel manifold is an assembly of standardized stock members which, with only limited machining operations, can be assembled into an endless variety of manifolds. Where two such stock members form a joint in the manifold, they may have transverse slots or notches cut in them, each slot having essentially the same width as the member that intersects it and a depth of half the height of the component members' cross-section.

Each member has a portion of reduced-thickness at the bottom of the notch. A straight bore extends along each member through its unnotched portions. This longitudinal bore extends off-center in the unnotched portions of each member. Where the slotted portions of the two members are planes fitted into each other, the axes of the longitudinal bores of the two members are on different planes, cross bores in the reduced-thickness portions connect the longitudinal bores with eachother. The cross bores join the longitudinal bores of both members to constitute a continuous passage for the resin. The same joint between any two members of the manifold can be repeated using additional slotted or notched stock members to form a manifold for many mold cavities. Both "T" shaped junctions and "X" shaped passage junctions can be constituted.

There is a danger of high-pressure fluid material leaking at the junction of the bores of two assembled members of a manifold. This concern is met introducing a seal between two assembled parts. The seal seats in a counterbore, the ends of the seal bearing against abutting surfaces of the assembled members.

In a preferred embodiment of the invention, the manifold is constructed of elongated members having identical cross-section. At the points where two of the members intersect, identical slots are machined of one half the member's thickness; the width of the slot in each member equals the width of the other member. The reduced-thickness portion of each member is fitted into the notch of the other member. The resulting structure is self supporting, relatively rigid, and all members become nested into each other. The upper and lower surfaces of the intersecting members are in parallel planes, being the upper and lower surfaces of the manifold.

The longitudinal bore in each member is plugged at the ends. Cross bores at the abutting surfaces of the notches form communicating channels between the lengthwise bores of the members. The bottom surfaces of the notches abut each other and are held under pressure by suitable fastners. Seals may be placed in recesses provided between the surfaces to ensure that no leaks of resin occur. In addition to the fastners, the members may be forced against each other by the clamping action of the mold and the back plate, which apply constant pressure against these mold members wherever they form an intersection.

Each of the end plugs in the bores has an inclined surface at the back of the head. The plugs are held-in place and they are prevented from rotating by a dowel pin, which has an inclined surface at an angle matching the back of the head's angle. The pin is driven through a cross hole which is at right angles to the plugs. The dowel is kept from loosening by a setscrew.

As one embodiment of a manifold, two sets of heating elements are placed in channels which are machined on the outer surfaces alongside the entire periphery of the manifold and are held in place by malleable metal heater covers. One set of heaters is placed at the top, of each member of the manifold and one set at the bottom surface of each member; the heating elements are normally regulated individually to maintain the manifold at the proper temperature, by well known means.

In another embodiment of the invention, individual heating elements are placed only on one side of each member of the manifold, namely their unnotched sides, opposite the interlocking notches. In this way, each member of the manifold can be disassembled for repair, cleaning or heater replacement without disturbing the rest of the components or the heating elements. Each member of this manifold has a straight longitudinal bore. The bore extends through the reduced-thickness portion of each member; the bore extends in each member closer to its unnotched surface than to its notched surface.

The heated nozzles are made of high strength steel and they are clamped between the manifold and each of the mold cavities. The heating elements of the nozzles are of the cartridge type and in the illustrated embodiment they are placed in two channels 180 degress apart, formed alongside the body or stem of the nozzle. The heating elements are parallel to the resin passage and held snugly in place by removable heater covers. The heater covers transfer heat from the outer surfaces of the heating elements back to the body of the nozzle. The heater covers and the heater elements are pressed toward the body of the nozzle by spring retainers.

In order to equalize the temperature along its entire length, the nozzle has bores which in the illustrative nozzles are located at 90 degrees from the heater channel and parallel to the resin passage in the nozzle. In one embodiment of the novel nozzles these bores are filled with a liquid such as water, then sealed. The liquid should have good heat transfer properties. The liquid cools the hotter sections of the nozzle and by conduction, convection and agitation tranfers the heat lengthwise of the nozzle to cooler areas of the nozzle shank.

Heater retainers extend incompletely around the nozzle. If a cartridge heater of the nozzle needs replacement, retainers are rotated around the nozzle to align the openings or gaps of the retainers with the heater channel. The heater cover is then free to be lifted, releasing the heater for replacement.

In another embodiment of the invention, solid rods of highly conductive metal such as copper or silver, occupy the cavities of the nozzle as an alternate means to produce an averaging effect for maintaining uniform temperature along the nozzle.

BRIEF DESCRIPTION OF THE DRAWINGS

The foregoing and other objects and aspects of the invention will be better appreciated from the following detailed description of illustrative apparatus embodying one of various aspects of the invention, reference being made in the description to the accompanying drawings. In the drawings:

Referring to FIG. 1 of the drawings, a manifold assembly 1 is clamped against nozzles 2 between a multi-cavity mold 3 and a back plate 4. The manifold is kept from contacting the back plate by insulator spacers 5. Spacer blocks 6 separate back plate 4 from plate 3 of the two-part mold spacer blocks 6 are not so wide as to prevent the manifold and the nozzles from being forecefully clamped together between the back plate 4 and part 3 of the mold. The back plate is fastened to mold 3 by a suitable number of screws 7. In operation, plastic resin is introduced by a supply nozzle 9, which is part of an injection mold press not shown, and it travels through passage 10 of the manifold and passage 11 of the nozzles to fill the cavities 8. The resin is solidified in the cavities and parts 12 are ejected when the core side 13 of the mold is separated.

Figure 1:
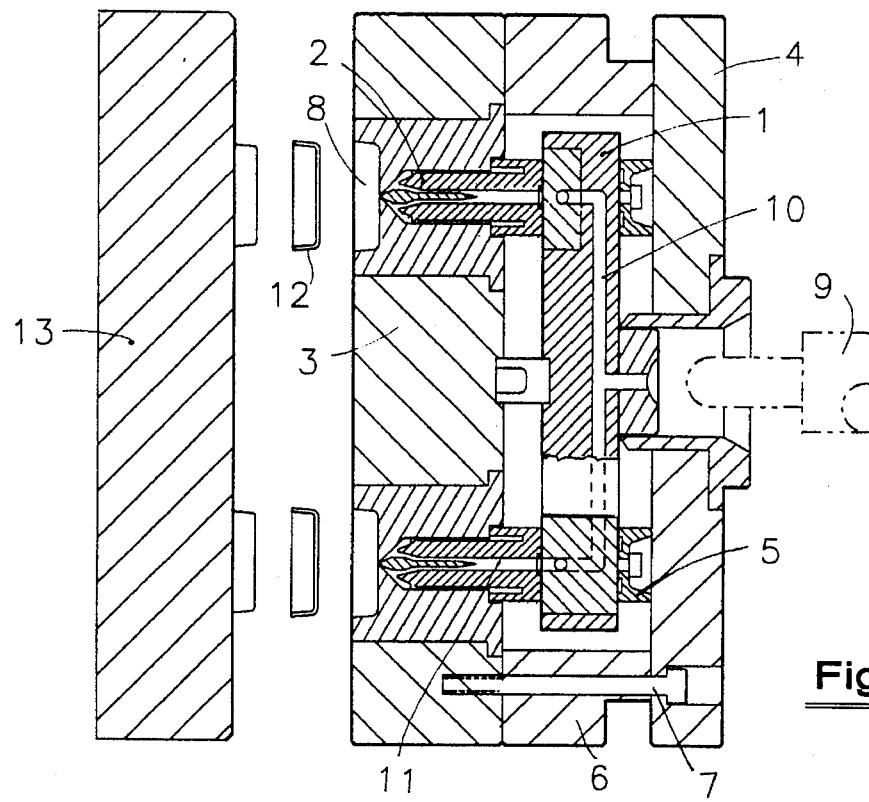
FIG. 1 is a section and typical molding apparatus incorporating a novel manifold and nozzle system as viewed in the planes designated A—A in FIG. 2
Figure 2:
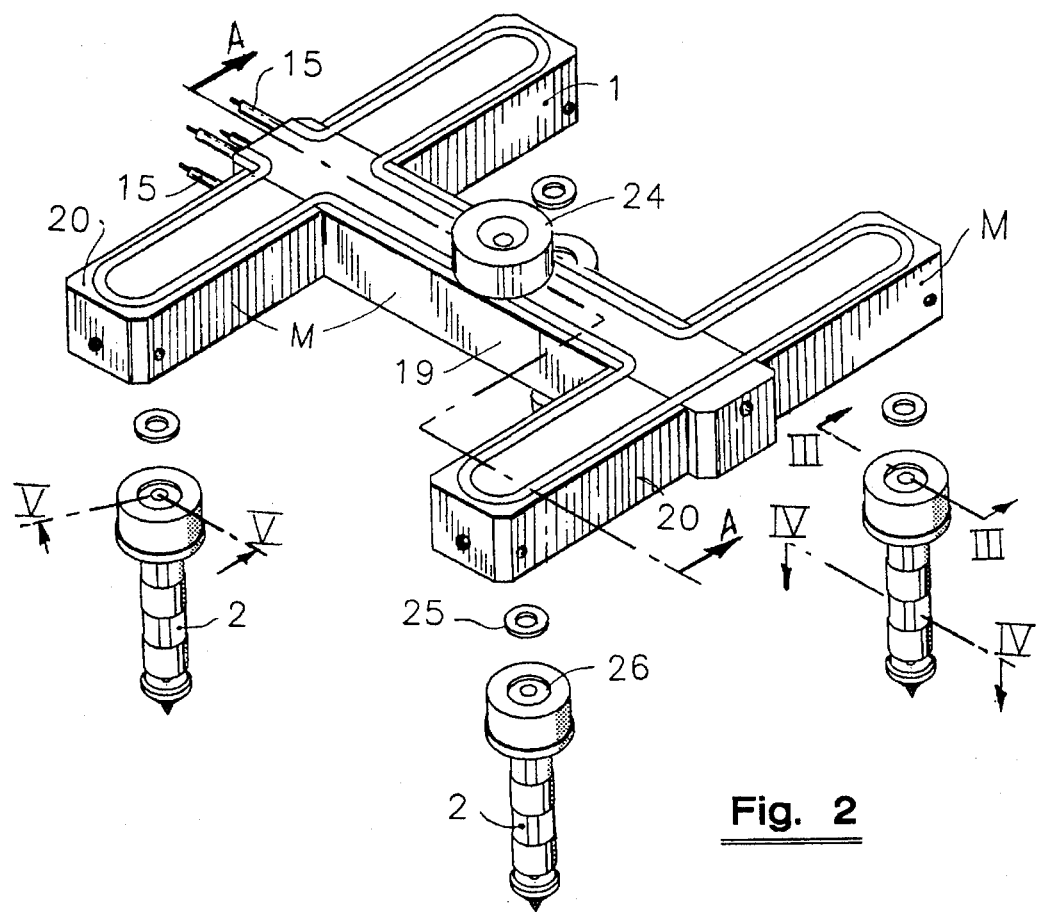
FIG. 2 is an exploded perspective view of the manifold system in FIG. 1, portions of this manifold system being omitted for clarity.
Figure 3:
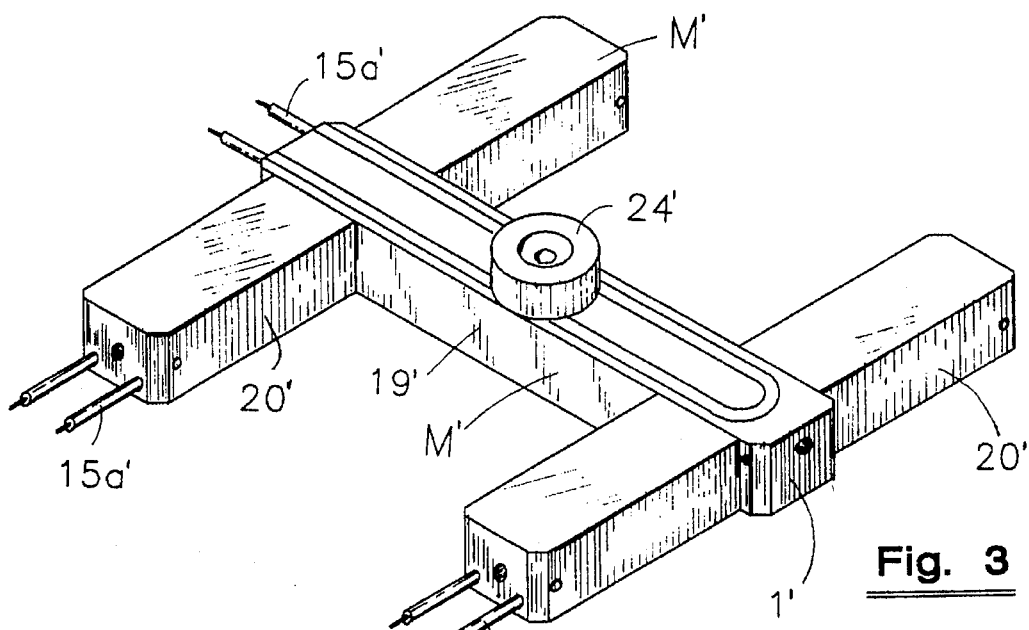
FIG. 3 is a perspective view of an alternative form of the manifold in FIG. 2.
Figure 4:
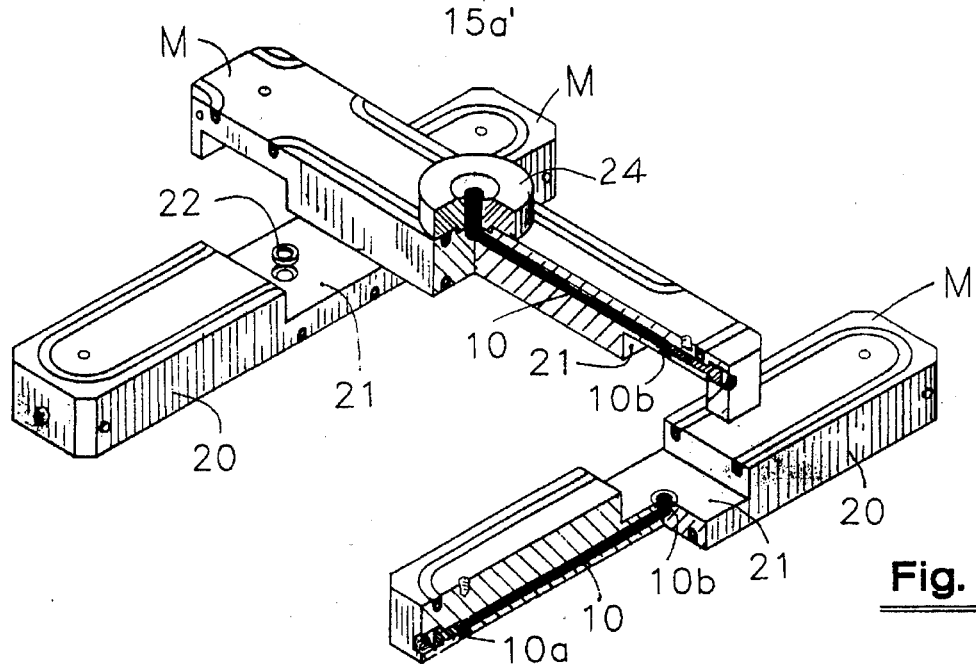
FIG. 4 is an exploded perspective of the manifold in FIG. 2, portions being broken away and shown in cross-section.
Figure 14:
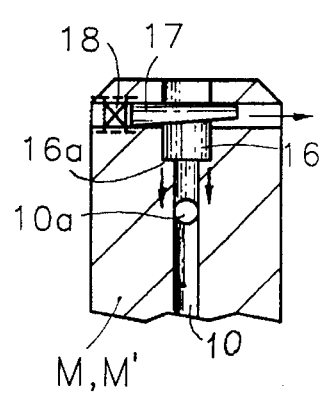
FIG. 14 is a fragmentary section along plane II—II of one end of a stock component of the manifold in FIG. 6.

The manifold 1 of FIGS. 2 and 4 and the manifold 1 of FIG. 3 are constructed using three members M and three members M' of essentially identical rectangular cross-section. These members M and M' can be routinely prefabricated to accurate dimensional standards and later cut to required lengths. They may be modified to make manifolds of various dimensions and configurations. The components in FIG. 3 have primed numerals corresponding to the numerals used in FIGS. 2 and 14 for like components.

Figure 5:
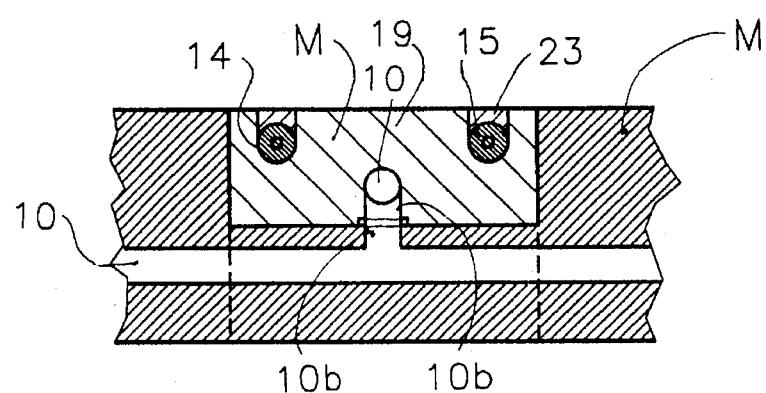
FIG. 5 is a fragmentary cross-section of a joint of the manifold in FIGS. 2–4, as seen at the plane I—I of FIG. 3.

Each member M and M' has a pair of grooves 14 and 14' that is semi-circular at its bottom. Grooves 14 and 14' run symmetrically along both top and bottom faces of members M (FIGS. 2 and 4). Electric heating elements 15, with covers 23 (FIG. 5) are tightly received all along the lengths of grooves 14. In applications where easy disassembly of the manifold is desirable (FIG. 3), the grooves 14a and the elements 15a and heater covers are placed on only one face of each members M'. In a further description with FIGS. 2 and 4, it will be clear that some of the heating elements must be removed in order to disassemble members M (FIGS. 2 and 4). Members M' (FIG. 3) can be disassembled without the need of first removing any of the heating elements.

Member 19 and both members 20 of the manifold in FIGS. 1–5 are made of modified stock members M. Member 19 can be called the main conduit for the resin and members 20 may be called the branch conduits. When manufacturing a manifold of the form in FIG. 1–5, notch or slot (FIG. 4) is machined to a depth of exactly one half the height of the members at a suitable distance from its end so that the upper faces of members M will be coplanar and the down faces of members M will also by coplanar. The widths of each notch equals the width of the member M at each junction, the flat bottom 21 of each notch in each member M abuts the bottom 21 if this notch in the other member M. Longitudinal bore 10 is formed end-to end in each member M. This bore is centered between the sides of each notch: but because it is in the reduced-thickness portion of member M at each notch, the bore is much closer to the unnotched face of member M or M' than to the opposite face.

A bore 10a is drilled at right angles to the main bore of the manifold 1 and 1' for alignment with the bores 11 of nozzles 2. Another bore 10b is drilled at right angles from the bottom 21 of each notch to the longitudinal main bore 10 at the center of each notch. Bores 10b of two intersecting members M are aligned with each other; bores 10, 10a and 10b constitute resin passages through the manifold. A counterbore at the end of bore 10b forms a seat for a seal 22 between the abutting surfaces of the mating notches of the members M, ensuring that the resin when under pressure, does not leak between the members.

Figure 7:
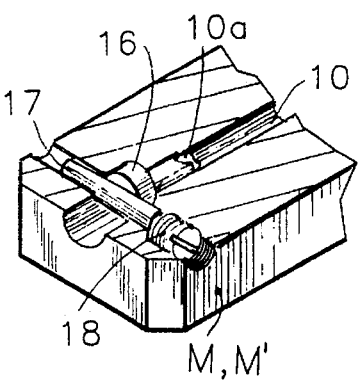
FIG. 7 is a fragmentary perspective cross-section taken along plane II—II of FIG. 6.

End-to-end bores 10 in each member M and M' are closed at the ends with plugs 16 (FIG. 7) which have slanted surface at the back of the head. Pin 17 is used to keep the plug firmly seated against a sealing shoulder 16a (FIG. 14) of member M or M', preventing it from rotating as well as from being pushed back by the resin under pressure with the passage. One side of pin 17 is machined flat, at an angle that is the same as the angle on the back of the plug's head, so that when the pin is pressed with little force, the inclined plane forces the plug at a 90 degree direction with a much greater force, sealing the end of the resin passage. A set screw 18 maintains the pin and the plug under pressure.

Figure 6:
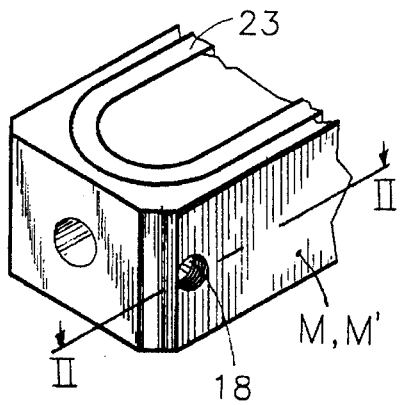
FIG. 6 is a fragmentary perspective of one end of a stock component of the manifold.

Heater covers 23 (FIGS. 5–6) are fitted in the heater groove to allow heat transfer throughout the entire surface of the heating elements.

A socket 24 for the machine nozzle 9 (FIG. 1) is mounted to the manifold and serves as the main entry port for the molten resin. This socket is heated by virtue of being in close proximity with the manifold.

Bores 11 of nozzles 2 are aligned with the bores 10a of the manifold so that molten plastic resin can go from the manifold to the nozzles unimpeded. A seal 25 (FIG. 2) is placed in a counterbore 26 in the nozzle and becomes fixed between the nozzle and the manifold to prevent leaks off plastic material.

Figure 9:
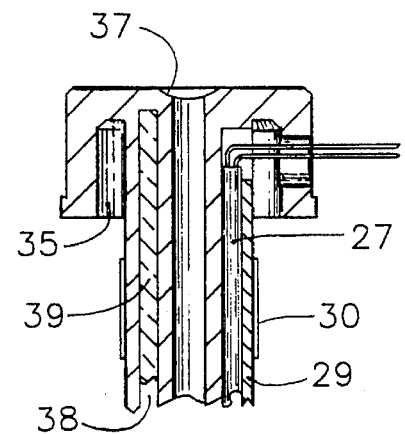
FIG. 9 is a fragmentary section of a nozzle as in FIG. 2 taken along the plane III—III of FIG. 2 showing a modification of the nozzle FIG. 8.

Instead of a counterbore 26, nozzles can be provided with a spherical radius 37 (FIG. 9) for use in a single cavity mold, in which case the machine nozzle 9 can be connected directly to the mold nozzle without employing a manifold.

Figure 10:
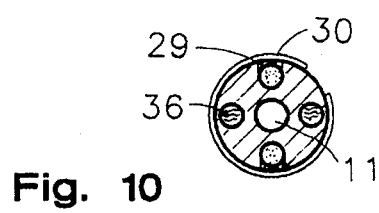
FIG. 10 is a cross-section of a nozzle as in FIG. 2 taken along the plane IV—IV of FIG. 2.

The nozzle 2 is heated by cartridge heaters 27 placed in grooves 28 parallel to the resin passage 11. A removable heater cover 29 (FIGS. 10 and 11) fits snugly into the groove. The heater cover and the heater are kept under constant pressure against the body of the nozzle by "C" spring clips 30.

A solid torpedo shaped tip 31, made of highly conductive metal, is held at the extremity of the bore 11 by a restriction or taper 32 at the end of the bore, and is provided with two channels 33 to allow the molten resin to pass through the nozzle. Pointed tip 34 maintains the resin that passes into the cavity 8 molten by traneletting heat from the the nozzle body. Air gap 35 restricts the flow of heat from the nozzle to the mold.

Cartridge heaters such as the one employed in the nozzle are notorious for generating heat very unevenly along their length. The central section of the heater has a tendency of becoming much hotter than its extremities.

Figure 8:
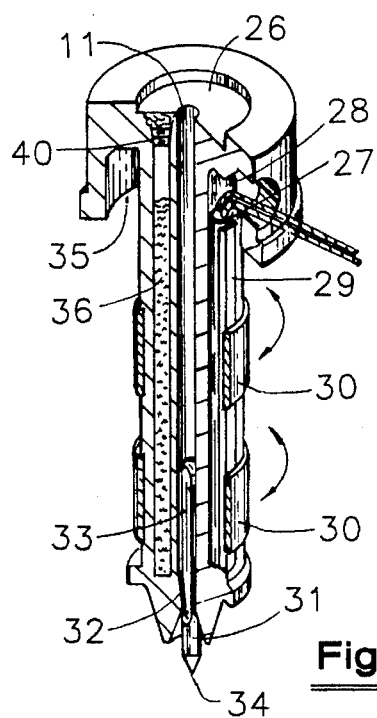
FIG. 8 is a perspective view of the nozzle in FIG. 2 with a portion sectioned off along the intersecting planes V—V to show the internal features of the nozzle.

To avoid the situation of having the plastic resin degrading at the center while it is solidifying at the tip, the nozzle (FIG. 8) is provided with a plurality of bores 36 that are filled with a liquid such as water having good heat transfer properties. The end of the bores are tightly capped with plugs 40 and welded to ensure that no liquid escapes when the nozzle is heated to high temperatures. Heat is transferred by conduction and convection from the center to the ends of the nozzle; heat transfer is promoted by agitation due to vibration of the apparatus caused by the mold's opening and closing.

Figure 11:
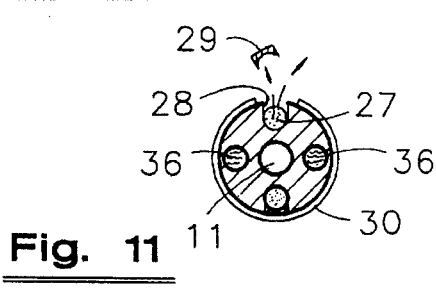
FIG. 11 is a cross-section of the nozzle of FIG. 2 like FIG. 10 but with the parts in another relationship.

Spring "C" clips 30' have an opening or gap wider than heater grooves 28. When a heater needs to be replaced, the clip is aligned with the groove and heater cover 29 is removed, exposing the cartridge heater. The heater can thus be pried out and replaced without the use of special tools (FIG. 11).

As an alternative method of transferring heat along the shank of the nozzle from the center to the ends, the nozzles can be built with a multiplicity of bores 38 in which rods made of highly conductivity metal such as copper or silver are inserted and pressed resulting in an averaging effect for the heat generated by the heaters 27.

Figure 12:
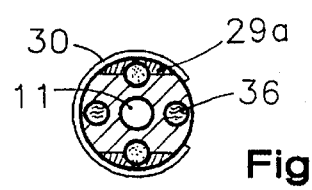
FIG. 12 is a cross-section of a modification of a nozzle in FIG. 2 taken along the plane IV—IV.
Figure 13:
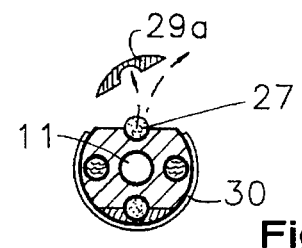
FIG. 13 is the same as FIG. 12 showing a retaining "C" clip aligned for removal of the heater.

Heater cover 29a can also be manufactured as a section of the cylindrical body of the nozzle (FIG. 12) thus it can be removed without prying, once "C" clip 30 is rotated leaving its opening clear of the cover. (FIG. 13).

The presently preferred embodiment of the invention in its various aspects, which are described in detail above, may be modified and adapted to various forms of molding apparatus by those skilled in the art. Consequently, the invention should be construed broadly in accordance with it's true spirit and scope.

I claim:

1. A manifold for injection molding apparatus including a pair of elongated members intersecting each other at a joint, each of said members having mutually opposite first and second generally flat sides, the first side of each of said members being coplanar with the second side of the other of said pair of members, portions of said second sides of said members being notched and a notched portion of each of said pair of members being received in a notched portion of the other of said pair of elongated members to constitute said joint, each of said members having a longitudinal bore closer to said first side thereof than to said second side thereof, and the longitudinal bore in each member bypassing said notch therein, elongated electrical heaters embedded in said first sides of said pair of members and extending generally along said longitudinal bores, said heaters also being embedded in and extending generally along a portion or portions of the second sides of said pair of members, which portion or portions extends or extend from said joint, each of said members having a cross bore at said joint, said cross bores of said members being aligned with each other and said aligned cross bores providing a resin passage connecting said longitudinal bores with each other.

2. A manifold for injection molding apparatus including an elongated member having a longitudinal bore extending to an end thereof for providing a resin passage, a heater extending generally along said elongated member for heating resin in said passage, a transverse bore extending from said longitudinal bore, said transverse bore being near to but spaced from an end of said member, and means for sealing said longitudinal bore between said end of said member and said transverse bore, said means for sealing including a seat surrounding and extending outward of said longitudinal bore, a plug in sealing engagement with said seat, and means for forcing said plug against said seat, said means for forcing including a taper pin extending transverse to said member, said taper pin bearing against a portion of said plug so as to drive said plug against said seat.

3. A manifold as in claim 2, wherein said plug has a slant surface against which the tapered pin bears when forcing the plug against said seat.

4. A manifold as in claim 3, further including a screw threaded into said transverse bore and bearing against an end of the taper pin so as to tighten said taper pin against said plug, thereby to tighten the plug against its seat.

5. A manifold as in claim 2, wherein said plug includes a cylindrical transition portion filling the longitudinal bore between said transverse bore and said seat.

6. A manifold as in claim 2, wherein said plug includes a cylindrical transition portion filling the longitudinal bore between said transverse bore and said seat, the portion of the plug that bears against the seat being a cylindrical head portion having a larger diameter than said transition portion.

7. A manifold as in claim 6, wherein said head portion of the plug has a slant end surface whose slant is complementary to said taper pin, said forcing means including a screw bearing endwise against an end of said taper pin.

8. A manifold as in claim 2, wherein a portion of said plug occupies that portion of the longitudinal bore between the seat and the transverse bore.

9. A manifold for injection molding apparatus including a pair of elongated members intersecting each other at a joint, each of said members having mutually opposite first and second generally flat sides, the first side of each of said members being coplanar with the second side of the other of said pair of members, portions of said second sides of said members being notched and a notched portion of each of said pair of members being received in a notched portion of the other of said pair of elongated members to constitute said joint, each of said members having a longitudinal bore closer to said first side thereof than to said second side thereof, and the longitudinal bore in each member bypassing said notch therein, each of said members having a cross bore at said joint, said cross bores of said members being aligned with each other and said aligned cross bores providing a resin passage connecting said longitudinal bores with each other.

* * * * *